A. E. TANNER & E. A. CLAREMONT.
JOINT FOR ELECTRIC CABLES.
APPLICATION FILED JULY 22, 1916.
1,223,444.
Patented Apr. 24, 1917.
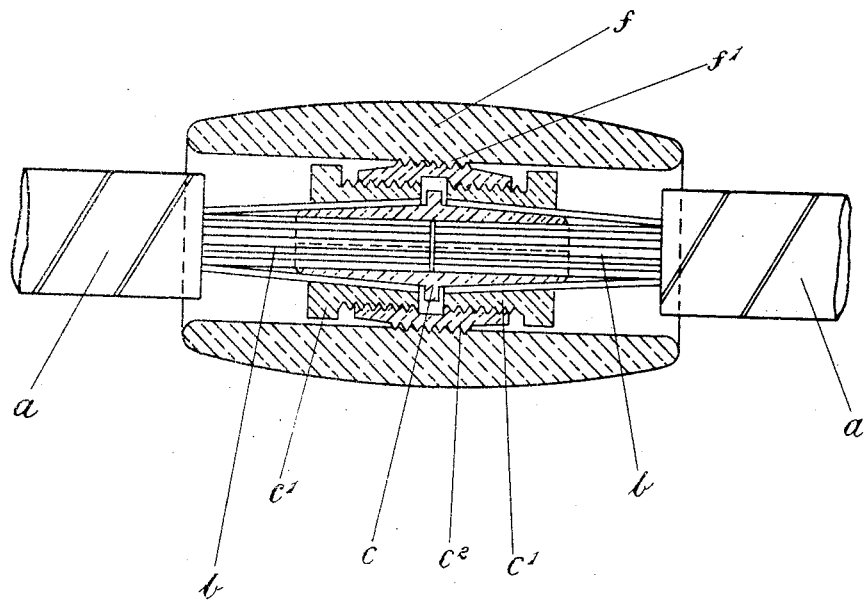
Inventors:
Albert Edgar Tanner
Ernest Alexander Claremont
by
R. Haldane
Their Attorney.

UNITED STATES PATENT OFFICE.

ALBERT EDGAR TANNER, OF STRETFORD, AND ERNEST ALEXANDER CLAREMONT, OF HIGH LEIGH, ENGLAND.

JOINT FOR ELECTRIC CABLES.

1,223,444.

Specification of Letters Patent.

Patented Apr. 24, 1917.

Application filed July 22, 1916. Serial No. 110,646.

*To all whom it may concern:*

Be it known that we, ALBERT EDGAR TANNER, of Croughton House, Chester Road, Stretford, in the county of Cheshire, England, and ERNEST ALEXANDER CLAREMONT, of Broom Cottage, High Leigh, in the county of Cheshire, England, have invented certain new and useful Improvements in Joints for Electric Cables, of which the following is a specification.

This invention is a modification of the invention described in the specification filed in our application Serial No. 96690 filed 10th May, 1916.

In that specification it was explained that in joining the conductor or conductors (composed of a number of strands) of two sections of an electric cable it was usual to place over the ends of each conductor to be joined a metal sleeve (thereinafter referred to as the ordinary sleeve) having in it a longitudinal slit or slits and to pour over the whole molten solder which flowed through the said slits, permeated between and filled the crevices between the separate strands constituting the conductor and the space between such conductor and the sleeve and flowed all around the sleeve making when the solder had cooled a solid connection. It was also explained that the solder was wiped or smoothed on the outside by the operator and the whole formed into a regular cylindrical shape with conical ends merging into the conductor, and that when the conductor or (if more than one) all the conductors were thus connected the whole joint was incased in a box which was filled with an insulating compound. It was still further explained that it was very important, especially in the case of high tension cables, that there should not be left on the surface of the joint any point, protuberance or other projection or unevenness of the solder, in which case the electrical stress at that point or part was greatly intensified, the insulation was rapidly destroyed and the cable would break down, the object being to make a joint in which such a defect if left was rendered innocuous or its mischievous effect very much reduced.

It was then explained in said specification that the invention consisted of providing and arranging a sleeve (therein called the outer sleeve) which had no sharp angles or edges this sleeve embracing and being located at a slight distance from the solid joint of the conductor, or of each of same, the said sleeve being in electric connection with and consequently at the same potential as the ordinary sleeve and in said specification described there was by reference to drawings, an example of a solid joint made as above indicated with such an outer sleeve and there was claimed an electric cable joint constructed or made by placing a metal sleeve over the ends of the conductors to be jointed allowing molten solder or the like to flow into and around the said sleeve and the strands of the conductor and placing an outer sleeve such as described in position in electrical contact with the first mentioned sleeve.

It has now been realized that the mischief which it was intended to minimize or remove in the said invention is not limited to the particular form of joint described in the aforesaid specification and that the said invention is applicable to remove or minimize such mischief in all other forms of electric joints where it may occur.

According to our present invention in an electric joint other than a joint made by means of a sleeve and solder as particularly described and referred to in the aforesaid specification we provide an outer sleeve such as above described and which is in addition to and apart from the device for connecting the sections of the conductor and by any suitable means maintain the same in such position in reference to the joint as therein described and secure the same in electrical contact with the conductor.

In the accompanying drawing is shown an example of our present invention in a joint where a metal mechanical connector is used.

The drawing is a longitudinal section.

*a* designates the insulated conductor; *b* the bared conductor; *c*, $c^1$ and $c^2$ respectively parts of the mechanical connector comprising an outer collar $c^2$, bushings $c^1$ threaded thereunto and an inner tubular member *c;* and *f* designates the outer sleeve having a threaded part $f^1$ to connect with a correspondingly threaded part of the outer collar of the mechanical connector.

What we claim as our invention and desire to secure by Letters Patent of the United States is:—

1. A joint for electric cables comprising a sleeve having a smooth outer surface and adapted to be placed over the ends of the conductors to be joined, and a mechanical connector within said sleeve for connecting the ends of said conductors and comprising a plurality of concentric interthreaded members in threaded engagement with the interior of said sleeve, the aforesaid sleeve being in conductive connection with said conductors through said mechanical connector.

2. A joint for electric cables comprising a sleeve having a smooth outer surface and adapted to be placed over the ends of the conductors to be joined, a conductive mechanical connector within said sleeve for connecting the ends of said conductors, said connector comprising an outer collar in threaded engagement with the interior of the sleeve and bushings engaging the conductor ends and in threaded engagement with said collar whereby the sleeve is in conductive connection with the conductors.

3. A joint for electric cables comprising a sleeve having a smooth outer surface and adapted to be placed over the ends of the conductors to be joined, a collar having screw-threads about its outer periphery for the reception of said sleeve, a pair of bushings adapted to be screw-threaded into the opposite ends of said collar, and an inner tubular member receiving the ends of said conductors to be joined and mounted within said bushings.

4. A joint for electric cables comprising a tubular member tapering from its central portion toward its ends and adapted to receive the ends of the conductors to be joined, a bushing about either end of the tubular member, said bushings being tapered to correspond to the tapered ends of said tubular member, a collar adapted to engage about said bushings, and a sleeve adapted to be secured intermediate its ends to said collar and having a smooth outer surface.

In witness whereof we have signed this specification in the presence of two witnesses.

ALBERT EDGAR TANNER.
ERNEST ALEXANDER CLAREMONT.

Witnesses:
  E. B. JOULE,
  C. A. NEALE.